United States Patent
Horak

[15] 3,703,246
[45] Nov. 21, 1972

[54] LIQUID LEVEL CONTROL

[72] Inventor: John Horak, 470 Ottawa Avenue, Apt. 13C, Hasbrouck Heights, N.J. 07604

[22] Filed: March 19, 1970

[21] Appl. No.: 20,895

[52] U.S. Cl..............................222/17, 222/67
[51] Int. Cl. ......................................B07d 5/30
[58] Field of Search.........200/84 C; 222/17, 386, 66, 222/67, 76, 249, 250; 137/416; 317/156 T; 73/441

[56] References Cited

UNITED STATES PATENTS

| | | |
|---|---|---|
| 3,114,478 | 12/1963 | Hilkemeier et al.......200/84 C |
| 3,351,084 | 11/1967 | Halkiades..................137/416 |
| 2,472,389 | 6/1949 | Von Stoeser...............222/67 |
| 2,701,912 | 2/1955 | Campbell et al.......222/386 X |
| 2,110,313 | 3/1938 | Warrick................317/156 T |
| 2,162,020 | 6/1939 | Johnson.......................73/441 |
| 3,283,095 | 11/1966 | Iannelli....................200/84 C |
| 3,389,603 | 6/1968 | Jacobs.................200/84 C X |

Primary Examiner—Robert B. Reeves
Assistant Examiner—John P. Shannon, Jr.
Attorney—Thomas N. Tarrant

[57] ABSTRACT

A liquid level sensing switching device comprising a magnetic float contained in a vertical channel and a magnetic reed switch positionable at calibrated levels adjacent the channel and means to dispense liquid from an associated container in quantities measured by the operation of said switch when the magnetic float drops from a predetermined level to the position of the switch.

3 Claims, 3 Drawing Figures

PATENTED NOV 21 1972 3,703,246

John Horak
Inventor
By Thomas N. Tarrant
Attorney

LIQUID LEVEL CONTROL

BACKGROUND OF THE INVENTION

1. Field of the Invention

The present invention relates to liquid level control systems and particularly to such systems using magnetic floats and magnetic switches for level sensing.

2. Description of the Prior Art

Acid baths are in great use today for etching and plating purposes. Acid etches are used in great volume for printing plates, printed circuits, integrated circuits, etc. Acid baths are also used for plating printed circuit boards and for endless other plating requirements. Accurate and fast measurement of the acid quantities is highly desirable to obtain controlled consistent results without increasing the time involved.

It has been common practice to dispense acid by manual control into measured containers or to visually determine the correct amount by observing the level drop in the dispensing container. For speed and accuracy, automatic switching control is more desirable.

In order to be suitable for use with acids, such switching control must either use sensing elements impervious to the effects of acids or must operate wholly outside the liquid, as for example by use of photo sensors.

A number of devices have been made using magnetic floats and magnetic reed switches for liquid level sensing. U.S. Pat. No. 3,419,695 to Dinkelkamp et al. describes a float switch assembly for sensing level in an oil reservoir. U.S. Pat. No. 3,366,276 to Fridley describes liquid dispensing apparatus in which one switch element indicates when a full container of concentrate can be added to a juice concentrate dispensing reservoir and a second switch element indicates when the concentrate level is too low for proper mixing with diluent. U.S. Pat. No. 3,200,645 to Levins describes an electric position sensor in which a series of magnetic switches are operated by a magnetic float to sequentially shunt impedances in a circuit driving a servo indicator for level indication.

SUMMARY OF THE INVENTION

The present invention utilizes, in parallel with a dispensing container, a nonmagnetic tube in which a tubular magnetic float rides at the liquid level of the container. A switch, responsive to the magnetic float, is carried by a slider on the exterior of the tube. The position of the slider sets the operative level of the switch. For calibration, the slider includes a pointer or similar indicating device cooperating with an adjacent calibrated scale. Control circuitry and devices are operative to close a dispensing outlet upon actuation of the magnetic responsive switch. One preferred embodiment of the invention comprises an acid dispenser with automatic refill mechanisms for filling to a predetermined level. Control circuitry connected with the magnetic responsive switch and a dispensing switch operates to dispense acid on manual operation of the dispensing switch until the level set by the slider is reached. The magnetic responsive switch operates to close the dispensing valve and enable the automatic refill. Thus each operation of the dispensing switch causes dispensing of acid from a predetermined "full" level to an adjustable level set by the slider.

Thus it is an object of the invention to provide an automatic acid dispenser. It is a further object of the invention to provide a novel adjustable level switch operative responsive to a magnetic float.

It is a further object of the invention to provide acid dispenser controls for automatically dispensing acid between two set levels in a dispensing container and refilling the container.

Further objects and features of the invention will become apparent upon reading the following description together with the drawing.

DESCRIPTION OF A PREFERRED EMBODIMENT

Figure 1:
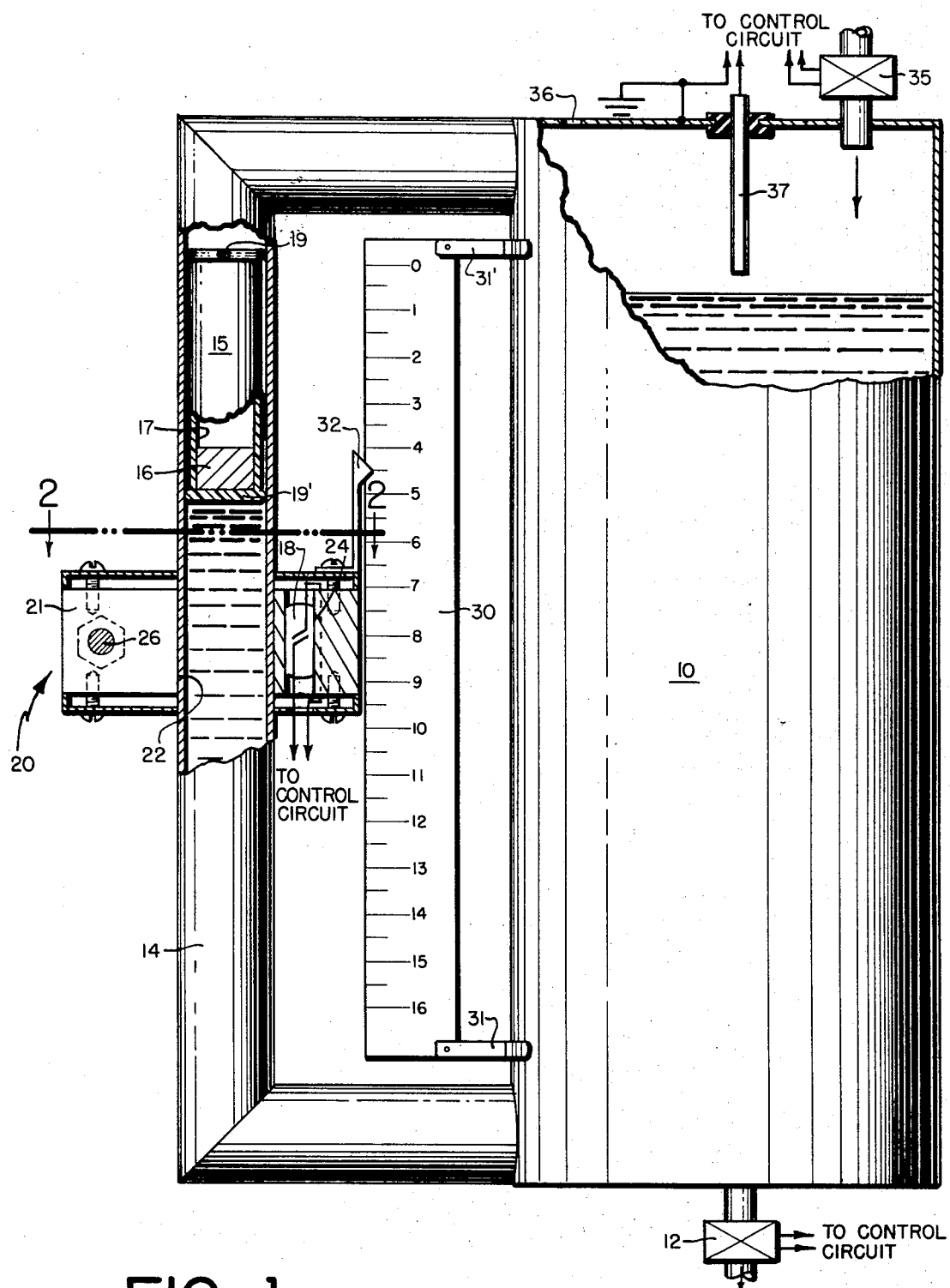
FIG. 1 is a diagrammatic elevation partially in section of a liquid dispensing system according to the invention.

The embodiment depicted in FIG. 1 comprises acid dispensing container 10 which is suitably made of stainless steel. While vitreous or acid resistant plastic containers are suitable, with a metal container, full-level sensor 37 can be merely an electrode for passing current through the acid to the container as will be described. Solenoid actuated outlet valve 12 is connected at the bottom of container 10. Thin-walled tube 14 is connected side-arm fashion parallel with container 10. While depicted as integral with container 10, tube 14 will more commonly be a separate element connected by means of compression fittings or the like. Tube 14 must be made of a nonmagnetic material such as nonmagnetic stainless steel. Glass or quartz is usable, but less preferred since it would require thicker walls. The walls of tube 14 are desirably thin so as to minimize attenuation of magnetic flux lines passing through them. A wall thickness of 0.032 inches for tube 14 has been used.

Magnetic float 15 is suitably disc magnet 16 molded into plastic capsule 17. Alnico or ceramic magnet material can be used for magnet 16. Magnet 16 can be polarized vertically so that one pole faces up and the other down. This will produce flux lines extending from top to bottom around the exterior of magnet 16. This is effective for a magnetic reed switch oriented vertically. While other orientations can be used, in some cases rotation of float 15 would alter the operation so that suitable modifications of tube 14 and float 15 would be required to prevent such rotation. The strength of magnet 16 need only be that required for reliable operation of reed switch 18. Capsule 17 must be enough smaller in diameter than tube 14 to ensure free passage in the tube. It has been found desirable to mold capsule 17 with small projecting nubs 19 and 19' around its perimeter at top and bottom to act as guides maintaining the horizontal position of float 15 in tube 14 constant.

Reed switch 18 is a conventional magnetic reed switch suitable for carrying low currents for control purposes. Switch 18 is carried in a vertical position in slider assembly 20.

Figure 2:
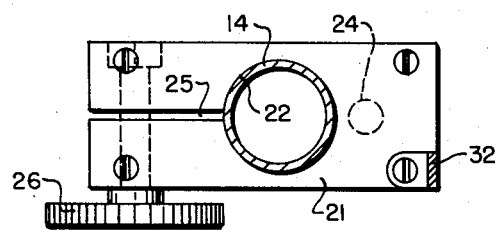
FIG. 2 is a plan view of the slider assembly along 2—2 of FIG. 1.

Slider assembly 20 is depicted as block 21 of aluminum having large cylindrical hole 22 for passing over tube 14 and small cylindrical hole 24 for carrying switch 18. Block 21 has split 25 on one side of hole 22 and screw 26 (see FIG. 2) can be turned to tighten or loosen block 21 on tube 14 by compressing or releasing split 25.

Scale 30, secured to container 10 by supports 31 and 31' is calibrated to read in the desired units of measurement. Thus the numbers can represent, for example, liters. Pointer secured to slider 20, rides adjacent to scale 30 for indicating selected calibrations.

In this embodiment, "0" on the scale represents a full container 10. The other calibrations indicate the level to which container 10 must be emptied in order to dispense the indicated amount.

Scale 30 is suitably a transparent tube such as a glass tube upon which the calibrations are marked. Supports 31 and 31' are suitably connections to container 10 so that the liquid level in container 10 can be observed visually on scale 30. This is helpful for correcting calibration adjustments. However, where fixed adjustments are made in manufacture, a transparent tube is not necessary and a solid flat scale may be attached to container 10 or even marked on tube 14.

In FIG. 1, pointer 32 is offset from slider 20 to compensate for the difference between the flotation level of float 15 and the median level of magnet 16. When scale 30 is solid, with no visual display of the liquid level, scale 30 can be offset and pointer 32 can be centered on slider 20.

Container 10 of FIG. 1 has solenoid controlled inlet valve 35 for refilling container 10. Valve 35 may be connected to automatic control circuitry for refilling container 10 after each dispensing operation.

Vent hole 36 in the top of container 10 prevents pressure buildup in container 10.

Zero level sensor 37 is a sensor for signaling that container 10 is full, i.e., that it has reached the "0" level relative to scale 30. When container 10 is a metal acid container, sensor 37 is suitably a single conductive (acid resistant) electrode. When the acid level contacts the sensor it completes (as an electrolyte) a conductive path between container 10 and sensor 37. By electrical connections to container 10 and sensor 37, control circuitry can recognize the full indication by means of a small electric current through the conductive path. Operation will be described after giving the details of an exemplary control circuit.

Figure 3:
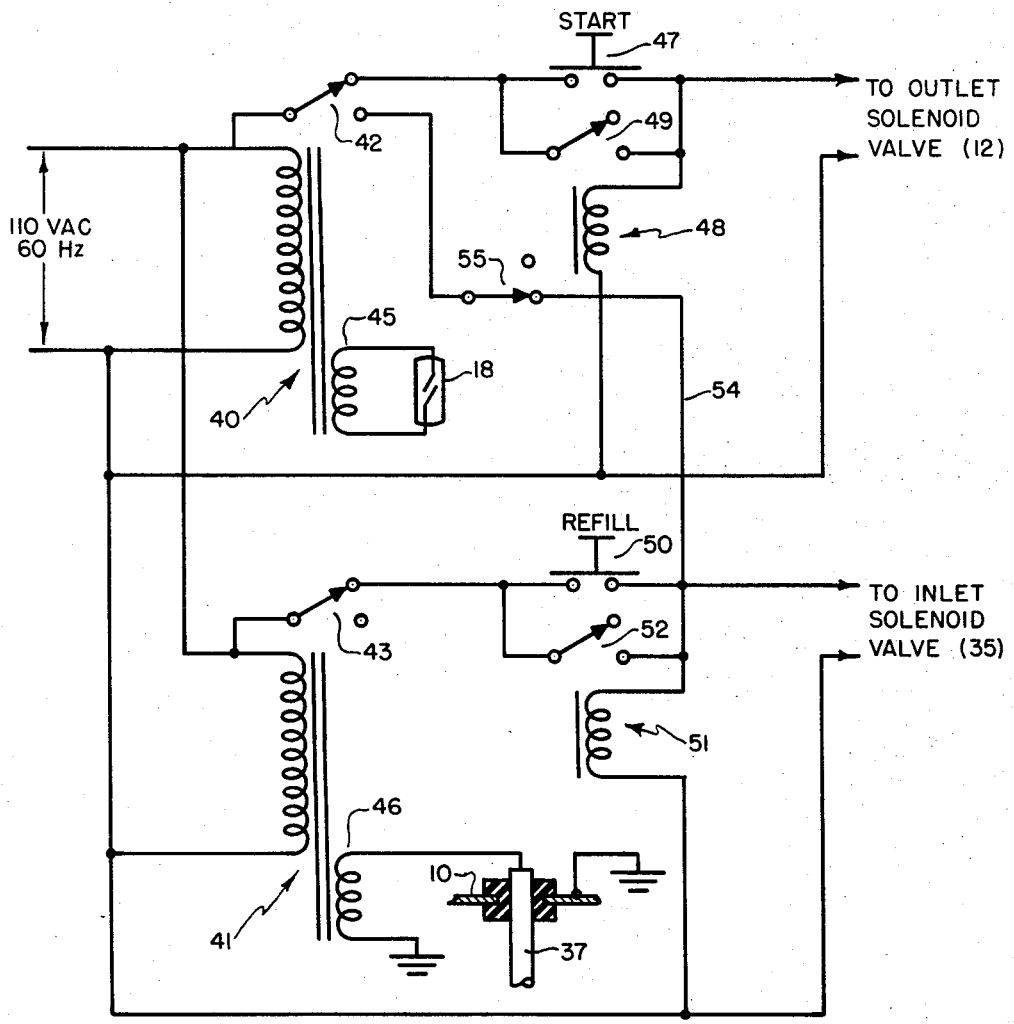
FIG. 3 is a schematic of control circuitry suitable for operation of the dispensing system of FIG. 1.

FIG. 3 schematically depicts an exemplary control circuit for the inventive system using isolation relays. Isolation relays, as used herein, are a combination of a step-down transformer and a relay in a single core as depicted by relays 40 and 41 in FIG. 3. A short across the step-down winding increases the magnetic flux through the core actuating the relay. Relays of this type are available from Alco Electronic Products, Inc. of Lawrence, Mass. under the tradename "Alcoswitch-Relay." Two isolation relays, 40 and 41 are connected to the usual 110 v AC line or other convenient AC power source. Isolation relays 40 and 41 have normally closed relay contacts 42 and 43 respectively. A load across secondary windings 45 and 46 causes relay contacts 42 and 43 respectively to open.

Momentary press-to-start switch 47 connects relay contact 42 to solenoid valve 12 and to relay 48. Relay contact 42 in the closed position connects to one side of the AC line while solenoid valve 12 and relay 48 are connected to the other side of the AC line. Thus switch 47 supplies current to both valve 12 and relay 48 actuating valve 12 to open and closing relay contact 49 of relay 48. Relay contact 49 is across switch 47 and thus holds valve 12 and relay 48 in operation.

Magnetic reed switch 18 is connected across secondary 45 of isolation relay 40. Upon closing of switch 18, relay contact 42 is switched to its open position breaking the circuit to valve 12 and relay 48.

Momentary press-to-refill switch 50 connects relay contact 43 to solenoid valve 35 and to relay 51. Relay contact 43 in the closed position connects to one side of the AC line while solenoid valve 35 and relay 51 are connected to the other side. Thus switch 50 supplies actuating current to both valve 35 to open and contact 52 of relay 51 to close. Relay contact 52 is across switch 50 and thus holds valve 35 and relay 51 in operation.

Sensor 37 is connected to one side of secondary winding 46 and container 10 is connected to the other side of winding 46. When a conductive path is established between sensor 37 and container 10, secondary 46 is loaded and relay contact 43 opens.

Interconnecting circuit 54, for more fully automatic operation, uses the "open" position of relay contact 42 to close a circuit from the AC line to valve 35 and relay 51 thus bypassing press-to-refill switch 50. Disabling switch 55 opens circuit 54 when manual refill control is desired.

Fully automatic operation of the preferred embodiment described requires connection by valve 35 to an adequate refill supply. A typical sequence of operation is as follows:

Slider 20 is moved to where pointer 32 indicates the quantity to be dispensed. Switch 50 is operated to ensure container 10 is full (to the "0" level). Start switch 47 is depressed to start the cycle. Outlet valve 12 opens to start dispensing. The acid level in container 10 drops until magnet 16 actuates switch 18. This causes relay contact 42 to open shutting off valve 12 at the correctly measured quantity. In the open position, relay contact 42 connects the AC line through circuit 54 to inlet valve 35 commencing the refill operation. As the level rises, switch 18 opens and relay contact 42 closes. However, since relay 48 has in the meantime reset to "open" and relay 51 has set to "close," relay contact 42 has no effect. Valve 35 continues to refill container 10 until the acid contacts sensor 37. The acid establishes a conductive path between container 10 and sensor 37 loading secondary winding 46. Relay contact 43 switches to "open" and another dispensing cycle can be started.

While the invention has been described with respect to a specific embodiment, many variations thereof are contemplated. For example, the utility of the invention is not limited to dispensing acids. When electrically insulating liquids are used the zero level (full) sensor can be a float actuated switch or other conventional level sensor.

I claim:

1. A liquid dispensing system for automatically dispensing measured quantities of liquid comprising: Means for dispensing measured quantities of liquid and automatically refilling the dispensing container to a predetermined "full" level after each measured quantity is dispensed comprising:
   a. a container for liquid;
   b. an electrically operated dispensing valve connected as an outlet to said container;
   c. a cylindrical nonmagnetic tube connected to said container so as to carry liquid at the same level as in said container;
   d. a magnetic float riding in said tube at a level that varies directly with the liquid level in said container;
   e. a slider positionable at different calibrated levels with respect to said tube;
   f. a magnetic responsive switch secured to said slider adjacent to said tube so as to be actuated by the proximity of said magnetic float at a given level;
   g. first control circuit means responsive to said switch for closing said dispensing valve when said float actuates said switch;
   h. a second electrically operated valve connected as an inlet to said container;
   i. interconnection means responsive to actuation of said magnetic responsive switch to open said second electrically operated valve;
   j. sensing means responsive to a "full" level in said container; and,
   k. second control circuit means for closing said second electrically operated valve when said sensing means detects a "full" level, whereby when said dispensing valve is actuated to dispense liquid, a measured quantity of liquid is dispensed and the dispensing container is then automatically refilled to the original level.

2. A liquid dispensing system according to claim 1 wherein said first control circuit comprises an isolation relay with its secondary connected to said switch and its relay contact in series with an electrical line that energizes said dispensing valve to the open position whereby closing said switch causes said dispensing valve to close.

3. A liquid dispensing system according to claim 1 further comprising a manual switch connected in said first control circuit for commencing operation by actuating said dispensing valve.

* * * * *